(12) United States Patent
Kanda et al.

(10) Patent No.: US 7,803,253 B2
(45) Date of Patent: Sep. 28, 2010

(54) METHOD FOR DEHYDRATING WATER-CONTAINING SUBSTANCE USING LIQUEFIED MATTER

(75) Inventors: Hideki Kanda, Kanagawa (JP); Youichi Urakawa, Tokyo (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 1091 days.

(21) Appl. No.: 11/383,071

(22) Filed: May 12, 2006

(65) Prior Publication Data

US 2007/0062800 A1 Mar. 22, 2007

(30) Foreign Application Priority Data

Sep. 20, 2005 (JP) ............................ 2005-272634

(51) Int. Cl.
*B01D 3/00* (2006.01)
*B09B 5/00* (2006.01)
*C02F 1/04* (2006.01)
(52) U.S. Cl. ............................ 203/14; 34/378; 34/470; 95/254; 95/258; 159/47.3; 203/98; 210/767; 210/774; 528/500
(58) Field of Classification Search ................. 203/10, 203/14, 17, 98; 210/767, 702, 774, 805; 159/47.3; 95/254, 258; 34/378, 470; 528/493, 528/494, 499, 500
See application file for complete search history.

(56) References Cited

U.S. PATENT DOCUMENTS 4,014,104 A * 3/1977 Murphy ........................ 34/350

| 4,136,065 A * | 1/1979 | Yano et al. ...................... 512/5 |
| 4,157,404 A * | 6/1979 | Yano et al. .................... 426/429 |
| RE31,185 E * | 3/1983 | Greenfield et al. .......... 159/47.3 |
| 4,981,579 A | 1/1991 | Paspek et al. |
| 5,041,245 A | 8/1991 | Benado |
| 5,055,196 A | 10/1991 | Darian et al. |
| 5,373,647 A * | 12/1994 | Bernes et al. .................. 34/382 |
| 6,229,053 B1 * | 5/2001 | Sievers et al. ............... 568/493 |

(Continued)

FOREIGN PATENT DOCUMENTS

JP 55-157686 12/1980

(Continued)

OTHER PUBLICATIONS

"Care Root Service K. K., Caring and Welfare News", http://www.careroot.co.jp/info copy11.html, Sep. 20, 2005, 14 pages, with English Abstract of corresponding JP 2000-084533.

(Continued)

*Primary Examiner*—Virginia Manoharan
(74) *Attorney, Agent, or Firm*—Oblon, Spivak, McClelland, Maier & Neustadt, L.L.P.

(57) ABSTRACT

A dehydration method of a water-containing substance using a liquefied matter, including a step (1) of contacting a liquefied matter of a substance which is in a gas phase under a condition at ambient temperature and atmospheric pressure with the water-containing substance, to dissolve contained water in the water-containing substance into the liquefied matter, for obtaining the liquefied matter containing a large amount of water; and a step (2) of vaporizing the substance out of the liquefied matter containing a large amount of water, to thereby separate the substance as the gas from water.

16 Claims, 3 Drawing Sheets

U.S. PATENT DOCUMENTS 6,312,528 B1 * 11/2001 Summerfield et al. ......... 134/40
7,329,789 B1 * 2/2008 Schonemann et al. ....... 585/351

FOREIGN PATENT DOCUMENTS

| JP | 02-273502 | 11/1990 |
| JP | 02-292396 | 12/1990 |
| JP | 4-503630 | 7/1992 |
| JP | 09-177509 | 7/1997 |
| JP | 2001-187379 | 7/2001 |
| JP | 2002-336834 | 11/2002 |
| JP | 2003-53303 | 2/2003 |
| JP | 2003-220381 | 8/2003 |
| JP | 2005-238141 | 9/2005 |
| WO | WO 03/101579 A1 | 12/2003 |

OTHER PUBLICATIONS

U.S. Appl. No. 12/524,437, filed Jul. 24, 2009, Kanda, et al.

* cited by examiner

METHOD FOR DEHYDRATING WATER-CONTAINING SUBSTANCE USING LIQUEFIED MATTER

CROSS-REFERENCE TO RELATED APPLICATIONS

This application is based upon and claims the benefit of priority from Japanese Patent Application No. 2005-272634, filed Sep. 20, 2005, the entire contents of which are incorporated herein by reference.

BACKGROUND OF THE INVENTION

1. Field of the Invention

The present invention relates to a method for dehydrating a water-containing substance using a liquefied matter, and, more particularly to a dehydration method and a dehydration system in which contained water can be efficiently eliminated at operation temperature close to outdoor air temperature with small required power and which are applicable to water-containing substances in wide fields regardless of a contained water content and a type thereof.

2. Description of the Related Art

Water-containing substances exert inherent advantages that they does not tend to spontaneously combust owing to contained water. However, they have problems in terms of bulky weights and hygiene. Upon treating the water-containing substance as a raw material or a starting material, the contained water can become an obstacle.

As dehydration methods for the purpose of eliminating the contained water from the water-containing substance utilized in such a case, a variety of methods have been developed and utilized depending on types of the water-containing substances.

In paper diapers and sanitary products, high performance absorbers which have a water absorbable capacity several hundred times higher than their own weights and keep a water retention capacity even when pressure is applied are used as major materials. Thus, they have an excellent property in retaining a large amount of water, whereas the increased weight after its use results in difficulty in transportation upon disposal. If the contained water can be separated, then the materials of the paper diapers may be reused, and it is anticipated that total waste amount can be reduced, which is preferable in terms of resource conservation.

Consequently, the techniques for removing urine and blood from the used paper diapers and sanitary products are being developed for proposal. For example, there has been reported a technique in which the used paper diaper which contains water such as that of urine is immersed in an aqueous solution of a detergent and calcium chloride to expel the contained water from the paper diaper, simultaneously the diaper is pulverized to fractionate into plastic, absorbable polymer and pulp by a wet gravity separation method, and the pulp among them is collected to reuse as a raw material of the paper diaper (Patent document 1).

In organisms such as animals, plants and microorganisms, the contained water occupies a majority of components thereof. Upon disposal, handling or preservation of such an organism, removal of water may trim weights and make treatments easy. For example, there is a necessity to eliminate jelly fish because it prevents hydroelectric power generation. The majority of the content of jelly fish is water. Thus, it is anticipated that if the contained water is eliminated, handling such as disposal becomes easy, and various dehydration techniques have been developed.

One example of the dehydration technique for the jelly fish is as follows: landed floating organisms (nektons) whose major content is the jelly fish are pulverized. Alum and an antioxidant is then infused for stabilizing and deodorizing the jelly fish-mashed water while solid contents and the contained water (treated water) are separated using a coagulant in a pressure flotation separation equipment. Subsequently, the solid contents are treated using a dehydrator and the contained water is treated using a wastewater treatment equipment (e.g., see Patent document 1).

Another method proposed is as follows: the landed floating organisms (nektons) whose major content is the jelly fish are pulverized, and the solid contents of the jelly fish are degraded with an enzyme, which are then treated using the wastewater treatment equipment (e.g., see Patent document 2).

Non-patent document 1: Care Root Service K.K., Caring and Welfare News,
http://www.careroot.co.jp/info_copy11.html
Patent document 1: JP 2001-187379 A Publication
Patent document 2: JP 2003-53303 A Publication

SUMMARY OF THE INVENTION

However, in the conventional dehydration method of the paper diaper described above (Non-patent document 1), it is necessary to use a large amount of water in the treatment, and the method has been disadvantageous in terms of resource conservation. Further, since large amount of wastewater containing calcium chloride is produced, it has been necessary to further perform the wastewater treatment in order to avoid a problem of water quality pollution. A pulverization efficiency is poor because the pulverization of the paper diapers is performed under a wet condition, and additionally, it has not been possible to efficiently fractionate after the pulverization.

When the conventional dehydration method described above is applied to the treatment of the used sanitary products, the blood is diluted in the wastewater because the blood is subjected to dilution with the aqueous solution of calcium chloride. That is, entropy of the blood is further increased in the wastewater. Thus, thermodynamically much energy is required for decontamination of the wastewater, which has been problematic in terms of efficiency of the wastewater treatment.

As a method for disposing the sanitary products by avoiding the wastewater treatment without relying on the conventional dehydration method described above, incineration is conceivable. However, in the case of the incineration, there has been a problem that a combustion temperature is lowered owing to the contained water included in the sanitary product and it is highly likely to produce harmful substances such as dioxin which are discharged as combustion gas.

As to the dehydration technology for the jelly fish, the method described in Patent document 1 is the method in which flocks of the organic solid contents are aggregated, which are then collected. Thus, it has been difficult to efficiently treat depending on sizes of the flocks in some cases. That is, when the flocks are too large, a treating time for a post-treatment process after organic components have been aggregated from solid components becomes long, which is problematic. Conversely, when the flocks are too small, the amount of the organic matters dissolved in a liquid component becomes large, and a treating time in a post-treatment process for reducing BOD of the liquid component (filtrate) becomes long, which is also problematic.

In the method described in Patent document 2, there has been a problem that a concentration of the organic matters in the produced wastewater is high and the wastewater as it is can not be discharged because of an environmental problem.

In all existing technologies, only limited kind of water-containing substance subjected are applicable. Each method has been developed depending on natures of the contained water and the substance itself contained in the subjected water-containing substance. No method is so far uniformly applicable to various kinds of water-containing substances with various contained water contents.

In the light of such a present circumstance, the present invention aims at providing a dehydration method and a dehydration system which are applicable to various water-containing substances regardless of a type, a composition and a content of contained water and can efficiently eliminate the contained water.

The present inventors extensively studied to accomplish the above object, and focused on the dehydration technology of coal in the process. When the coal is used as a raw material for generation of electricity, it is necessary to eliminate contained water in advance because inexpensive coal contains a large amount of water. The present inventors have developed the technology for efficiently dehydrating the contained water in such a coal by dehydrating at temperature close to outdoor air temperature, i.e., at about 0 to 50° C. while efficiently recovering a chemical substance used for the dehydration (see International Publication W003/101579 Publication).

The present inventors have found out that this dehydration technology for the coal can be broadly applied to not only the coal but also other water-containing substances having a variety of composition and containing water at a variety of amount, and that the contained water is almost completely eliminated from various water-containing substances, and attained to the present invention.

The present invention provides the following inventions.

[1] A dehydration method of a water-containing substance using a liquefied matter, comprising a step (1) of contacting a liquefied matter of a substance which is in a gas phase under a condition at ambient temperature and atmospheric pressure with the water-containing substance, to dissolve contained water in the water-containing substance into the liquefied matter, for obtaining the liquefied matter containing a large amount of water; and a step (2) of vaporizing the substance which is in the gas phase under the condition at ambient temperature and atmospheric pressure out of the liquefied matter containing a large amount of water, to thereby separate the substance as the gas from water.

[2] The dehydration method according to [1] further comprising a step (3) of collecting the gas of the substance which is in the gas phase under the condition at ambient temperature and atmospheric pressure, which has been vaporized and separated in said step (2) and obtaining a liquefied matter by liquefying the gas, wherein the liquefied matter obtained in the step (3) is reused in said step (1).

[3] The dehydration method according to [1] wherein the substance which is in the gas phase under the condition at ambient temperature and atmospheric pressure is a substance which is in a gas phase at 25° C. and at 1 atm.

[4] The dehydration method according to [1] wherein the substance which is in the gas phase under the condition at ambient temperature and atmospheric pressure is a mixture of one or more selected from dimethyl ether, ethyl methyl ether, formaldehyde, ketene and acetaldehyde.

[5] The dehydration method according to [1] wherein the water-containing substance is a used high performance absorber, an organism or a biomass raw material.

[6] The dehydration method according to [1] wherein the contact in said step (1) is a countercurrent contact of said liquefied matter with said water-containing substance.

[7] The dehydration method according to any one of [1] to [6] wherein an amount of the liquefied matter to be contacted with the water-containing substance in said step (1) is a theoretical amount at least required for obtaining the liquefied matter containing a large amount of water by dissolving the contained water in the water-containing substance into the liquefied matter.

[8] The dehydration method according to [1] wherein a series of dehydration operation is performed at temperature ranging from −10 to 50° C.

[9] A substance from which contained water has been eliminated, obtained by the dehydration method according to [1].

[10] A dehydration system of a water-containing substance, said system comprising a compressor which applies pressure on a gas of a substance which is in the gas phase under a condition at ambient temperature and atmospheric pressure, a condenser which condenses said pressurized gas to make a liquefied matter, a dehydrator which contacts said liquefied matter with a water-containing substance and dissolves contained water in the water-containing substance to make the liquefied matter containing a large amount of water, an evaporator which vaporizes the substance which is in the gas phase under the condition at ambient temperature and atmospheric pressure out of the liquefied matter containing a large amount of water, and a separator which separates a vaporized gas of said substance from the contained water, wherein said compressor, condenser, dehydrator, evaporator, and separator are serially linked.

[11] The dehydration system according to [10] wherein said condenser and said evaporator are connected via a thermal exchanger.

[12] The dehydration system according to [10] or [11] further comprising an expander which expands said vaporized gas of the substance which is in the gas phase under the condition at ambient temperature and atmospheric pressure, said expander being serially linked to said compressor such that a work externally performed in the expander is recovered and the work is put in as a part of power in said compressor.

[13] The dehydration system according to any one of [10] to [12] wherein said compressor, condenser, dehydrator, evaporator and expander form a circuit and the substance which is in the gas phase under the condition at ambient temperature and atmospheric pressure is circulated in the circuit.

[14] The dehydration system according to any one of [10] to [13] further comprising a deaeration tower for deaerating and collecting the gas of the substance which is in the gas phase under the condition at ambient temperature and atmospheric pressure separated in said separator, said tower being linked to said separator such that the deaerated gas is collected and returned back to the circuit.

[15] The dehydration system according to any one of [10] to [14] wherein said dehydrator countercurrently contacts said liquefied matter with said water-containing substance.

The present invention provides a dehydration method which is applicable to various water-containing substances regardless of types, compositions and contents of the contained water. The present method can efficiently eliminate the contained water and contribute to the resource conservation because the method facilitates reuse and disposal of the water-containing substances. The present invention also provides a dehydration system for efficiently carrying out the above method.

The dehydration method of the present invention employs, as a vehicle for eliminating the contained water, the liquefied matter of the substance which is in the gas phase at ambient temperature and atmospheric pressure. That is, the present method employs the substance which has a high mutual solubility with the contained water and is in the gas phase under atmospheric pressure at temperature close to the outdoor air temperature. Therefore, no harsh condition is required when contacting with the contained water and separating from the contained water, and the dehydration can be performed at temperature close to the outdoor air temperature unlike the conventional techniques. The present method does not require evaporation of the water content upon separating the contained water and the liquefied matter. Therefore the present method does not require recovery of evaporation latent heat of the contained water, and it is possible to eliminate the contained water with saving energy.

Furthermore, it is also easy to collect the gas of the substance which is in the gas phase at ambient pressure and atmospheric pressure separated from the contained water. The collected gas may be used in circulation by liquefying again, and therefore, the method is excellent also in terms of energy efficiency. The liquefied matter can simply be removed by deaerating the separated wastewater, and load to the environment may be reduced.

According to the dehydration system of the present invention, it is possible to more efficiently carry forward the elimination of contained water using the substance which is in the gas phase at ambient temperature and atmospheric pressure.

By connecting the thermal exchanger, the evaporation latent heat may be collected and effectively utilized. More energy saving may be accomplished by recovering the work by expansion in the expander.

The other objects, features and advantages of the present invention are specifically set forth in or will become apparent from the following detailed descriptions of the invention when read in conjunction with the accompanying drawings.

DETAILED DESCRIPTION OF THE PREFERRED EMBODIMENTS

The present invention relates to dehydration of a water-containing substance, and the most prominent characteristic thereof is in that a solubility of contained water is noticeably changed by taking advantage of a gas liquid phase transition phenomenon of a substance which is in a gas phase at ambient temperature and atmospheric pressure. That is, the substance which is in the gas phase at ambient temperature and atmospheric pressure is liquefied by applying pressure or cooling, and the contained water in the water-containing substance is dissolved in a resulting liquefied matter. Subsequently when the temperature and the pressure are slightly changed, only a solvent is selectively evaporated, and the contained water is easily separated from the gas of the solvent.

The water-containing substance subjected to the present invention is not particularly limited as long as it is a substance containing water.

The "contained water" means water or an aqueous solution regardless of a composition and a source thereof. For example, water, blood, a body fluid and wastewater may be included.

"Containing" means that the foregoing contained water is included in some substance. In the substance, both size and components are not particularly limited, and it is preferable that the substance is in a form of a solid or slurry as the water-containing substance.

The manner of existence of the contained water in the water-containing substance is not particularly limited, and the contained water may be included inside, or may be present on outer surfaces or among solid particles. In some cases, the contained water may be present in fine pores inside the solid particles. A content percentage of the contained water in the water-containing substance is not limited.

Specific examples of such a water-containing substance may include high performance absorbers (used paper diapers and sanitary products), organisms (weeds, bouquets and jelly fish), biomass raw materials (wood chips, leftover meals, raw garbage and other so-called wastes), sewage sludge and soil.

The dehydration method and the dehydration system of the present invention will be described below.

A. Dehydration Method of the Present Invention

The dehydration method of a water-containing substance using a liquefied matter of the present invention is characterized by comprising the step (1) of contacting a liquefied matter of a substance which is in a gas phase at ambient temperature and atmospheric pressure with a water-containing substance, to dissolve contained water in the water-containing substance into the liquefied matter, for obtaining the liquefied matter containing a large amount of water; and the step (2) of vaporizing the substance which is in the gas phase at ambient temperature and atmospheric pressure out of the liquefied matter containing a large amount of water, to thereby separate the substance as the gas from water. The steps (1) and (2) will be described below.

First, in the step (1), a liquefied matter of the substance which is in the gas phase at ambient temperature and atmospheric pressure is contacted with a water-containing substance, to dissolve the contained water in the water-containing substance into the liquefied matter, for obtaining the liquefied matter containing a large amount of water.

The "substance which is in the gas phase at ambient temperature and atmospheric pressure" means a substance which exists in a gas state at least at a certain temperature and a certain pressure in the range of the ambient temperature and the atmospheric pressure. That is, as long as the substance exhibits the gas state at a temperature of A and a pressure of B that are included in the range of the ambient temperature and the atmospheric pressure, the substance need not exhibit the gas state at temperature other than the temperature A and pressure other than the pressure B in the range of the ambient temperature and the atmospheric pressure.

The ambient temperature means the temperature close to the outdoor air temperature, and generally means the range of −10 to 50° C. and particularly 0 to 40° C. The atmospheric pressure means the pressure close to the outdoor air pressure, and generally means the range of approximately 1 atm.

As the substance which is in the gas phase at ambient temperature and atmospheric pressure, specifically the substance which is in the gas phase under the condition at 25° C. and 1 atm and the substance which is in the gas phase under the condition at 0° C. and 1 atm are preferable. In particular, the substance which is in the gas phase under the condition at 25° C. and 1 atm and also in the gas phase under the condition at 0° C. and 1 atm is the most preferable.

The substance which is in the gas phase at ambient temperature and atmospheric pressure preferably has a boiling point close to or lower than the ambient temperature in the light of enabling the dehydration with small required energy. Particularly, it is preferable that the boiling point is 25° C. or less, preferably 10° C. or less, and further preferably −5° C. or less. The substance having the boiling point which exceeds the ambient temperature is not preferable because it is predicted that an energy source at high temperature is required for vaporizing the substance in the step (2) described later and the energy required for the dehydration is increased.

Examples of the substance which is in the gas phase at ambient temperature and atmospheric pressure may specifically include dimethyl ether, methyl ethyl ether, formaldehyde, ketene, acetaldehyde, butane and propane. These may be used alone or in mixture of two or more. Among them, preferred are dimethyl ether alone and a mixture of dimethyl ether with the other substance enumerated above.

Dimethyl ether has the boiling point at −24.8° C. at 1 atm, and is in the gas phase under atmospheric pressure at −10 to 50° C. Methods and apparatuses for producing dimethyl ether with high efficiency have been disclosed, for example, in JP H11-130714 A Publication, JP H10-195009 A Publication, JP H10-195008 A Publication, JP H10-182535 A to JP H10-182527 A Publications, JP H09-309850 A to JP H09-309852 A Publications, JP H09-286754 A Publication, JP H09-173863 A Publication, JP H09-173848 A Publication and JP H09-173845 A Publication. Dimethyl ether may be easily obtained in accordance with the technologies disclosed in these Publications.

In the present invention, the "liquefied matter" means a liquid obtained by liquefying the gas as described later. That is, in the present invention, the substance which is in the gas phase under the condition at ambient temperature and atmospheric pressure described above is used in the liquid state.

In the present step (1), the liquefied matter of the substance which is in the gas phase at ambient temperature and atmospheric pressure is contacted with the water-containing substance, to dissolve the contained water in the water-containing substance into the liquefied matter, for obtaining the liquefied matter containing a large amount of water.

That is, the contained water in the water-containing substance is dissolved in the liquefied matter by contacting the liquefied matter of the substance which is in the gas phase at ambient temperature and atmospheric pressure with the contained water in the water-containing substance, i.e., the contained water present on the outer surfaces of or inside the water-containing substance, to thereby make the liquefied matter containing a large amount of water.

In order to achieve contact of the liquefied matter of the substance which is in the gas phase at ambient temperature and atmospheric pressure with the water-containing substance, it is necessary to keep the substance in the liquid state. The method for keeping the liquid state is not particularly limited, and it is desirable to keep the liquefied matter under saturated vapor pressure. Particularly, it is desirable that the temperature in the step (1) is suitably set in the range of −10 to 50° C. and preferably in the range of 0 to 40° C.

Conditions other than the temperature and the pressure, such as a manner of operation for contacting the liquefied matter of the substance which is in the gas phase at ambient temperature and atmospheric pressure with the water-containing substance, an amount of the liquefied matter to be contacted, and a contact time period, may be set up optionally so that the contained water in the water-containing substance is dissolved in the liquefied matter.

The manner of operation for contact may be any method employed for the usual dehydration, such as immersion of the water-containing substance in the liquefied matter and distribution of the water-containing substance in the liquefied matter, but the countercurrent contact is desirable. That is, it is preferable to countercurrently contact the liquefied matter of the substance which is in the gas phase at ambient temperature and atmospheric pressure with the water-containing substance. It is also possible to carry out other operations for contacting in combination with the countercurrent contact. For example, after the countercurrent contact, the water-containing substance is immersed in the liquefied matter, and then the countercurrent contact is performed again.

The amount of the liquefied matter to be contacted with the water-containing substance may be optionally determined, and it is preferable that the amount is a theoretical amount at least required for dissolving the contained water in the water-containing substance for obtaining the liquefied matter containing a large amount of water. The theoretical amount of liquefied dimethyl ether required for dissolving 1 g of water in for example 14.9 g when dimethyl ether is used as the substance which is in the gas phase at ambient temperature and atmospheric pressure and the contained water is 1 g of water because the saturated vapor pressure of dimethyl ether at 20° C. is 0.51 Mpa and a saturation solubility of water in liquefied DME at 20° C. is 6.7% by weight.

The contact time period (dehydration time period) depends on the conditions such as types, amounts and contact methods of the water-containing substance and the liquefied matter, and is difficult to be defined. However, the time period during which the contained water in the water-containing substance is thoroughly dissolved in the liquefied matter may be set up optionally.

For the general condition in the countercurrent contact, a flow rate of the liquefied matter may be 10 L/h or more, preferably 30 L/h or more and more preferably 50 to 300 L/h, and a contact time period may be 5 minutes or more, preferably 8 minutes or more and more preferably 10 minutes to 5 hours.

For the general condition in the immersion contact, 10 L of the liquefied matter may be contacted with 85 g of the water-containing substance for 1 to 3 hours.

This way, in the step (1), the liquefied matter containing a large amount of water may be obtained by contacting the liquefied matter of the substance which is in the gas phase at ambient temperature and atmospheric pressure with the water-containing substance and dissolving the contained water in the water-containing substance in the liquefied matter, and simultaneously the contained water included in the water-containing substance is eliminated.

Subsequently, in the step (2), the substance which is in the gas phase at ambient temperature and atmospheric pressure in the liquefied matter containing a large amount of water obtained in the above (1) is separated as the gas from the contained water by vaporizing the substance. That is, the liquefied matter containing a large amount of water obtained in the above (1) is a mixture of the liquefied matter of the substance which is in the gas phase at ambient temperature and atmospheric pressure and the contained water derived from the water-containing substance, and by vaporizing only the liquefied matter of the substance which is in the gas phase at ambient temperature and atmospheric pressure in the mixture, it is possible to separate the liquefied matter from the contained water derived from the water-containing substance.

Vaporization means that the liquid (liquefied matter) is changed into the gas. The substance which is in the gas phase at ambient temperature and atmospheric pressure in the liquefied matter with high contained water content may be vaporized by raising the temperature and/or the pressure conditions higher than those in the step (1).

When the temperature is raised, it is preferable to raise up to the temperature higher than the boiling point of the substance which is in the gas phase at ambient temperature and atmospheric pressure. Since the present invention utilizes the substance which is in the gas phase at ambient temperature and atmospheric pressure, it is possible to usually vaporize at approximately ambient temperature, i.e., temperature close to the outdoor air temperature. That is, it is possible to vaporize by only placing back from a cooled state in the step (1) to an ambient temperature state rather than heating. It is preferable that the temperature for vaporization is the ambient temperature, i.e., −10 to 50° C., in particularly 0 to 40° C. depending on the liquefied matter and the pressure employed. When the pressure is reduced in the step (2), the pressure is less than the saturated vapor pressure, and may be determined optionally depending on the temperature condition.

This way, in the step (2), the substance which is in the gas phase at ambient temperature and atmospheric pressure may be easily vaporized to convert the liquid (liquefied matter) into the gas without using the harsh condition, and simultaneously this gas may be easily separated from the contained water derived from the water-containing substance.

As illustrated above, in the dehydration method of the present invention, the contained water may be removed from the water-containing substance by the above steps (1) and (2), and additionally, the step (3) of obtaining a liquefied matter by collecting the gas of the substance which is in the gas phase at ambient temperature and atmospheric pressure vaporized and separated in the step (2) and liquefying the gas may be included.

Liquefaction means that the gas of the substance which is in the gas phase at ambient temperature and atmospheric pressure is converted into the liquid. The substance which is in the gas phase at ambient temperature and atmospheric pressure may be liquefied by applying pressure and/or cooling, i.e., applying pressure or cooling, or combination of applying pressure and cooling. Specific conditions for the liquefaction may be selected optionally and advantageously in consideration of a standard boiling point of the substance used and the like. Particularly, when the cooling is employed, it is preferable that the cooling temperature is limited to the range up to the standard boiling point. In the light of performing the dehydration simply, it is preferable to set the cooling temperature in the range of the ambient temperature, i.e., the outdoor air temperature, for example −10 to 50° C. and particularly 0 to 40° C.

For example, when the substance having the boiling point of 0° C. at 1 atm is used as the substance which is in the gas phase at ambient temperature and atmospheric pressure, it is preferable to liquefy the substance by cooling at 0° C. or below. It is preferable to further combine the application of pressure. If liquefied only by cooling without applying pressure, the temperature of the liquefied matter becomes 0° C. or below, and it is likely that the dehydration becomes impossible.

When the substance having the boiling point higher than 0° C. at 1 atm, it is preferable to liquefy by cooling at the boiling point or above. Because, the saturated vapor pressure of the substance is less than 1 atm at the standard boiling point or below, and this causes less than 1 atm of an inner pressure in an apparatus, leading to the increase of production cost of the apparatus and difficult handlings.

The condition for applying pressure is difficult to be generalized, and may be preferably set so that the boiling point under the applied pressure is in the range of the ambient temperature, i.e., the outdoor air temperature, for example −10 to 50° C. and particularly 0 to 40° C. When combining with cooling, the condition may be determined depending on the cooling temperature.

The liquefied matter obtained in such a step (3) is preferable in terms of resource conservation because the amount of DME to be added in the dehydration method of the present invention is reduced and simultaneously the waste amount can also be reduced by reusing this in the above step (1).

In the dehydration method of the present invention, a saturation solubility of the contained water in the liquefied matter and a difference of water concentrations in the liquefied matter are driving forces of the dehydration because the liquid is used as the vehicle for the dehydration. A theoretical maximum value of a contained water amount capable of being dissolved in the liquefied matter is in proportion to the saturation solubility of the contained water, a density of the contained water and a volume of the liquefied matter. Comparing this with a theoretical maximum value of a contained water amount capable of being vaporized in dry inert gas conventionally used for the dehydration of the coal, the saturation solubility of the contained water is about 6% at approximately 20° C., which is very high compared with a saturated vapor partial pressure (about 2%) of water vapor in air. Such an extremely high mixture rate is impossible in the gas, and this is a characteristic in that the liquid is used as the vehicle for the dehydration. The density of water is much larger than the density of water vapor, and thus, it becomes possible to dehydrate using the liquefied matter in a small amount.

Meanwhile when the dehydration is performed with the dry inert gas, the water vapor mixed in this gas is diluted. Thus, the density of the evaporation latent heat becomes small, and it becomes difficult to recover the evaporation latent heat. In the practical application of a process to dehydrate the substance in a large amount, it is really important to effectively recover the evaporation latent heat. Thus, the use of the method for dehydrating using the gas as the vehicle is limited to the process on a small scale.

On the contrary, as the dehydration method of the present invention, when the liquid is used as the vehicle for the dehydration, the contained water can be eliminated without evaporating, and recovery itself of the evaporation latent heat is not required at all. As the liquid, the substance which is in the gas phase at ambient temperature and atmospheric pressure, i.e., under an outdoor air condition is used. Therefore, a series of the dehydration may be operated under the outdoor air condition, i.e., at temperature ranging from about −10° C. to 50° C. and by adjusting the pressure to approximately 1 atm as needed, and the dehydration may be performed with saving the energy.

The substance from which the contained water has been eliminated by the dehydration method of the present invention may be reused as a material. When the substance is disposed, the amount corresponding to the contained water is reduced to make the disposal easy, and the method is anticipated to be preferable in terms of resource conservation.

B. Dehydration System of the Present Invention

The present invention also provides the dehydration system using the liquefied matter.

The dehydration system of the present invention is characterized by being configured by serially linking a compressor which applies pressure to a gas of a substance which is in the gas phase under a condition at ambient temperature and atmospheric pressure, a condenser which condenses the pressurized gas to make a liquefied matter, a dehydrator which contacts the liquefied matter with a water-containing substance and dissolves contained water in the water-containing substance to make the liquefied matter containing a large amount of water, an evaporator which vaporizes the substance which is in the gas phase under the condition at ambient temperature and atmospheric pressure out of the liquefied matter containing a large amount of water, and a separator which separates a vaporized gas of the substance from the contained water.

Such a dehydration system of the present invention is suitable for practicing the dehydration method of the present invention described in the above (A). By the use of the present system, the dehydration method of the present invention may be efficiently carried forward.

Figure 1:
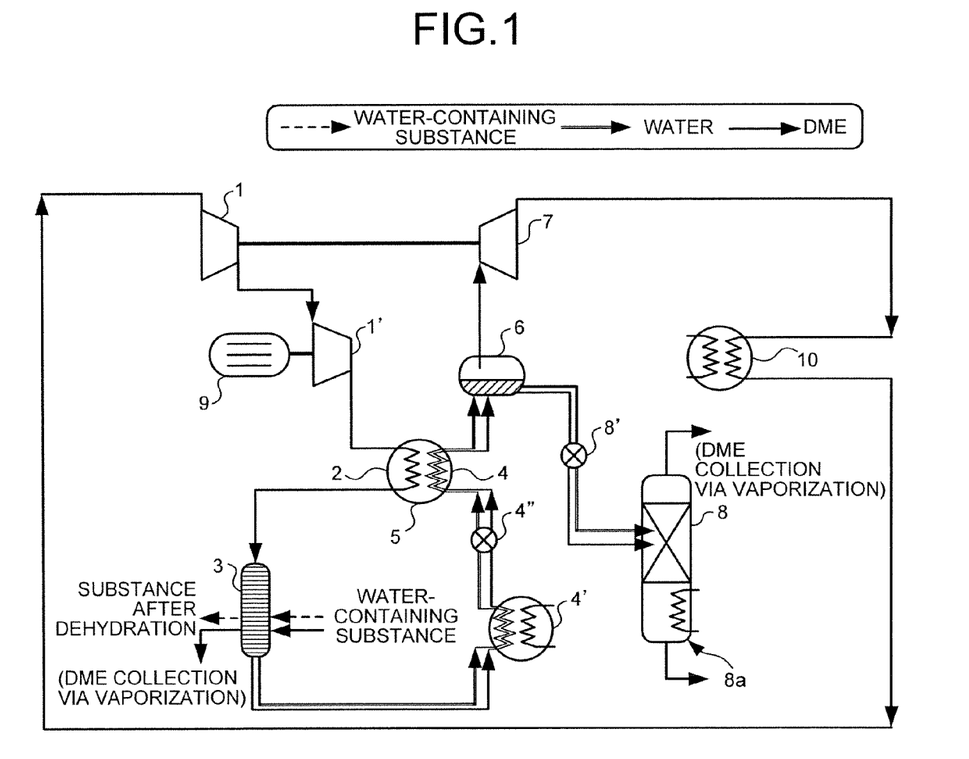
FIG. 1 is a schematic view showing one example of a configuration of a dehydration system of the present invention.

A schematic view of one example of a configuration of the dehydration system of the present invention is shown in FIG. 1.

This example is designed for the case of using dimethyl ether as the substance which is in the gas phase under the condition at ambient temperature and atmospheric pressure, but the system of the present invention is not limited thereto. Dimethyl ether has the boiling point of about −25° C. at 1 atm and is in the gas phase at 0 to 50° C. under atmospheric pressure as described in the above (A). Thus, in order to obtain dimethyl ether in the liquid state (liquefied matter of dimethyl ether) at ambient temperature, it is necessary to operate under applied pressure.

In the dehydration system shown in FIG. 1, the compressors 1, 1' for applying pressure on dimethyl ether vapor, the condenser 2 for liquefying the vapor applied pressure, the dehydrator 3 which performs the dehydration by contacting the liquefied dimethyl ether with the water-containing substance and dissolving the contained water to make the liquefied matter containing a large amount of water (liquefied dimethyl ether containing water), and the evaporator 4 which selectively vaporizes dimethyl ether from the liquefied dimethyl ether containing water resulted from the dehydration are serially linked with piping in this sequence. Among them, the condenser 2 and the evaporator 4 are connected with the thermal exchanger 5.

In the system shown in FIG. 1, further the separator 6 (gas liquid separator) which separates the dimethyl ether vapor obtained by vaporizing in the evaporator 4 from the contained water and an expander 7 which thermally insulates and expands the dimethyl ether vapor separated in the separator 6 are serially linked with piping in this sequence adjacent to the evaporator 4. The expander 7 is further linked to the compressor 1 to form a closed circuit (circulation path) as the whole system. In this circuit, dimethyl ether is circulated with changing phases of the gas and the liquid, and repeats the separation from and the contact with the contained water.

A cooler 4' and a pressure reducing valve 4" are serially linked adjacent to the dehydrator 3. These adjust the temperature and the pressure when the liquefied dimethyl ether is vaporized, and may be given the status as portions of the evaporator 1.

Additionally in the system shown in FIG. 1, a deaeration tower 8 is linked to the separator 6. The deaeration tower 8 is for deaerating dimethyl ether dissolved in the contained water separated from dimethyl ether in the separator 6, and specifically vaporizes and collects dimethyl ether by reducing pressure inside the deaeration tower using a pressure keeping valve 8'. When the pressure inside the gas liquid separator 6 is raised to more than the atmospheric pressure, the dimethyl ether gas is dissolved in the contained water separated in the gas liquid separator 6. Accordingly, if this contained water is directly discharged, the load to the environment is large and loss of dimethyl ether is large. Thus, dimethyl ether dissolved in the contained water is collected in the deaeration tower 8 to minimize the load to the environment and the loss of dimethyl ether.

The deaeration tower 8 is linked to the above circuit, and dimethyl ether deaerated and collected in the tower is placed back again to the circuit by piping not shown in the figure.

By providing a heating can 8a for heating the contained water with an underneath of the deaeration tower 8, it is also possible to facilitate the separation of dimethyl ether from the contained water and enhance a collection rate of dimethyl ether.

In the expander 7, a work externally performed is recovered and this work is put in and used as a part of power for the compressor 1 which applies pressure to dimethyl ether. As the compressor 1, two stages of a first compressor 1 and a second compressor 1" are disposed. The first compressor 1 is linked to the expander 7, and the work performed in the expander 7 is recovered and utilized as the power for the first compressor 1. The work externally performed in the expander 7 primarily indicates one performed along with volume expansion of dimethyl ether. Droplets convolved in superheated gas flow can be contaminated in the superheated gas of dimethyl ether which has come out from the evaporator 4. Thus, the work by vaporization of the contaminated droplets is obtained in the expander 7 in some cases, and this is included in the work externally performed.

The condenser 2 and the evaporator 4 is connected with the thermal exchanger 5, and thus, the evaporation latent heat of the liquefied dimethyl ether is recovered and effectively utilized.

Meanwhile, in the second compressor 1', the power is supplied from an electric machinery 9, and the work from the outside is put in only for this second compressor 1'.

In the system in FIG. 1, the cooler 10 is disposed. The cooler 10 adjusts the temperature of the gas which has come out from the expander 7 to an optimal temperature at an entrance of the compressor 1, and is disposed as needed in accordance with use conditions of the liquefied dimethyl ether.

Three of the water-containing substance, the contained water in the substance and the liquefied dimethyl ether are involved in the system in FIG. 1. Focusing on each substance, the flow of the present system will be described.

First, the water-containing substance is filled in the dehydrator 3 as shown by a dotted line in FIG. 1, and removed from a container to complete the treatment after being dehydrated by contacting with the liquefied dimethyl ether.

Subsequently, the flow of the contained water included in the water-containing substance in the system in FIG. 1 will be described below. The flow of the contained water included in the water-containing substance is shown by a double line in FIG. 1.

The contained water is supplied as the contained water included in the water-containing substance from the dehydrator 3 to the system. First, the contained water is eluted from the water-containing substance into the liquefied dimethyl ether in the dehydrator 3, and subsequently reaches the evaporator 4 in the form being dissolved in the liquefied dimethyl ether. Majority of the liquefied dimethyl ether is vaporized in the evaporator 4, and the contained water dissolved in the liquefied dimethyl ether is separated to reach the gas liquid separator 6. Furthermore, the dimethyl ether vapor is separated from the contained water in the gas liquid separator 6, and the contained water is left as wastewater.

Subsequently, the contained water is introduced into the deaeration tower 8. When the contained water is introduced into the deaeration tower 8, the pressure inside the deaeration tower 8 is reduced by the pressure keeping valve 8' and dimethyl ether is collected. Thus, the load to the environment and loss of dimethyl ether owing to direct discharge of the contained water separated in the gas liquid separator 6 may be minimized. By heating the contained water with the heating can 8a provided with the underneath of the deaeration tower 8, it is also possible to enhance the collection rate of dimethyl ether.

The deaerated contained water is discharged as a liquid in the can, but the dimethyl ether separated from this wastewater in the gas liquid separator 6 may be placed back again into the circuit of the dehydration system to use.

Subsequently, the flow of dimethyl ether in the system in FIG. 1 will be described. The flow of dimethyl ether is shown by a solid line in FIG. 1.

Pressure is applied on the dimethyl ether gas in the compressors 1, 1' to become the superheated gas, and subsequently becomes a supercooled liquid in the condenser 2. The supercooled liquid of the liquefied dimethyl ether is supplied to the dehydrator 3 to contact with the water-containing substance and dissolve the contained water thereof, and goes to the evaporator 4. The liquefied dimethyl ether is separated from the contained water in the evaporator 4 to become the superheated gas again. At that time, the condenser 2 and the evaporator 4 are connected with the thermal exchanger 5, and thus the evaporation latent heat of the liquefied dimethyl ether is recovered and effectively utilized. The superheated gas which has come out from the evaporator 4 performs the work in the expander 7, and the work is recovered as a part of the compressor power. The dimethyl ether gas which has come out from the expander 7 is sent again to the compressor 1 to circulate in the system.

Figure 2:
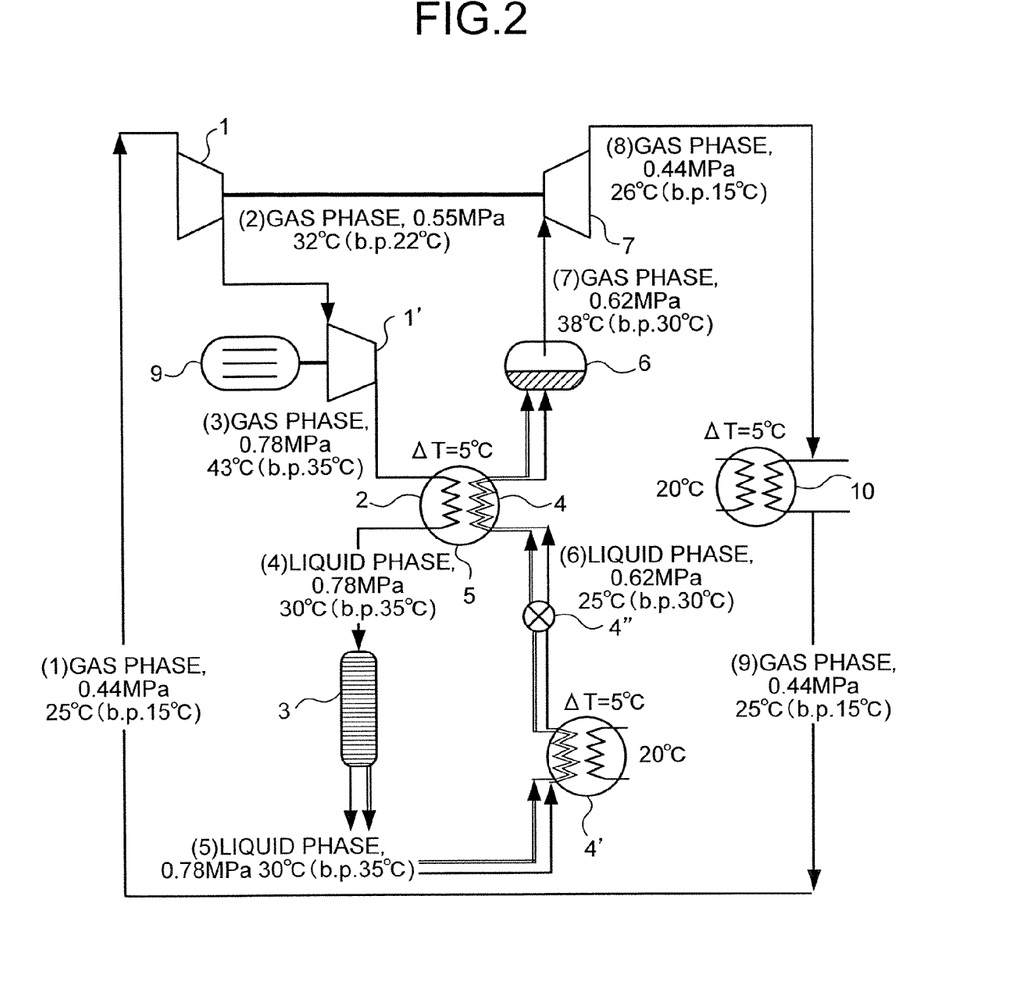
FIG. 2 is a schematic view showing temperature and pressure conditions in one example of the dehydration system of the present invention.

Setting examples of phase states, the pressure, the temperature and the saturated temperature when dimethyl ether is used in one example of the system of the present invention are shown in FIG. 2. In order to simplify the design of the pressure and the temperature, it is presumed that the deaeration tower 8 which vaporized dimethyl ether from the water was omitted and that the water and dimethyl ether could be separated completely in the gas liquid separator 6. It is also presumed that the water-containing substance treated in the dehydrator 3 contained no dimethyl ether. Furthermore it is presumed that the water-containing substance contained only the water as the contained water.

First, making the temperature at the entrance of the first compressor a starting point, the conditions for the temperature and the pressure were set up. When the temperature at the entrance of the first compressor is 25° C. and superheating to 10° C. higher than the saturated temperature is given, the pressure is 0.44 Mpa. The smaller a degree of superheating is, the more the pressure in the first compressor 1 is elevated. Thus, the power in the compressor 1 is decreased, but at the same time, a risk that the dimethyl ether gas is cooled with outdoor air to condense in the stage prior to the entrance of the compressor is increased. Since the heat capacity ratio of the dimethyl ether is as small as 1.11, the temperature does not tend to be raised when thermally insulated and compressed. Therefore, the degrees of superheating at exits (2), (3) in the first compressor 1 and the second compressor 1' are smaller than the degrees of superheating at the entrances in the compressors. In the present system, when the degree of superheating at the entrance of the compressor is determined, it is necessary to note the degree of superheating at the exit in the compressor.

The pressure at the exit (3) in the second compressor 1' is determined by the temperature of cooling water used for the cooler 4' before the evaporator 4. Here, it is supposed that the outdoor air temperature is 20° C. and that the temperature of the cooling water is equal to the outdoor air temperature. If an approach temperature in the cooler 4' is 5° C., the temperature of the liquefied dimethyl ether at the exit (6) of the cooler 4' (entrance of the evaporator) is 25° C. Further if the approach temperature in the condenser 2 and the evaporator 4 is 5° C., the temperature at the exit (4) in the condenser 2 is 30° C. The pressure for operating in the condenser 2 (pressure at the exit in the compressor) is determined by providing the degree of supercooling of 5° C. with the exit in the condenser 2 (entrance and inside of the dehydrator 3) so that dimethyl ether in the dehydrator 3 can stably exist as the liquid. In this case, since the saturated temperature is 35° C., the pressure at the exit (4) in the condenser 2 and the exit (3) in the compressor 1' (entrance of the condenser) is 0.78 Mpa. If thermal insulation and compression are supposed, the temperature at the exit (3) in the second compressor 1' is 43° C., which has been confirmed to be higher than the saturated temperature of dimethyl ether at the exit in the compressor.

Since the saturated temperature in the evaporator 4 is 30° C., it is necessary to reduce the pressure to the saturated pressure at 30° C. at the entrance (6) in the evaporator. The saturated pressure here is the saturated pressure of a mixed liquid of the water and dimethyl ether, and is 0.62 Mpa. Since a temperature difference between the condenser 2 and the evaporator 4 is 5° C., the temperature at the exit (7) of the evaporator 4 (entrance of the expander) is 38° C. Since the degree of superheating here is 8° C., a heat loss in the range of energy required for heating dimethyl ether in 8° C. increment is acceptable in the range after the exit in the second compressor 1' and before the entrance in the expander 7.

The dimethyl ether gas is separated from the water in the gas liquid separator 6, and then is thermally insulated and expanded in the expander 7. The pressure at the exit (8) in the expander is equal to the pressure at the entrance in the first compressor. The dimethyl ether gas is cooled to 26° C. by the thermal insulation and compression. Cooling is required because the temperature is 1° C. higher than the temperature at the entrance of the first compressor. The energy is recovered in the expander 7 to use as the power for the first compressor. If a thermal insulation efficiency in the expander 7 and the first compressor 1 is supposed to be 80%, it is determined that the temperature and the pressure at the exit in the first compressor are 32° C. and 0.55 Mpa, respectively.

Furthermore, in accordance with the temperature and the pressure already determined, the power required in the second compressor 1' is calculated by changing the thermal insulation efficiency in the expander 7 and two compressors 1 and 1'.

First, the total work required for the two compressors 1 and 1' is (Theoretical work required for the two compressors 1 and 1')/(Thermal insulation efficiency). Meanwhile, the work recovered by the expander 7 and put in as the power in the first compressor is (Theoretical work performed by expansion)×((Thermal insulation efficiency). Therefore, the work required for the second compressor 1' is (Theoretical work required for the two compressors 1 and 1')/(Thermal insulation efficiency)−(Theoretical work performed by expansion)×((Thermal insulation efficiency). Further, this work is necessary to be introduced in the form of the power. Thus, if its conversion efficiency is 0.35, (Work required for the second compressor 1')/0.35 is the total energy required for the second compressor 1'. This conversion efficiency has the same value as in the conversion efficiency of compression power for collecting latent heat of water vapor used for power estimation in an in-oil modification method.

Figure 3:
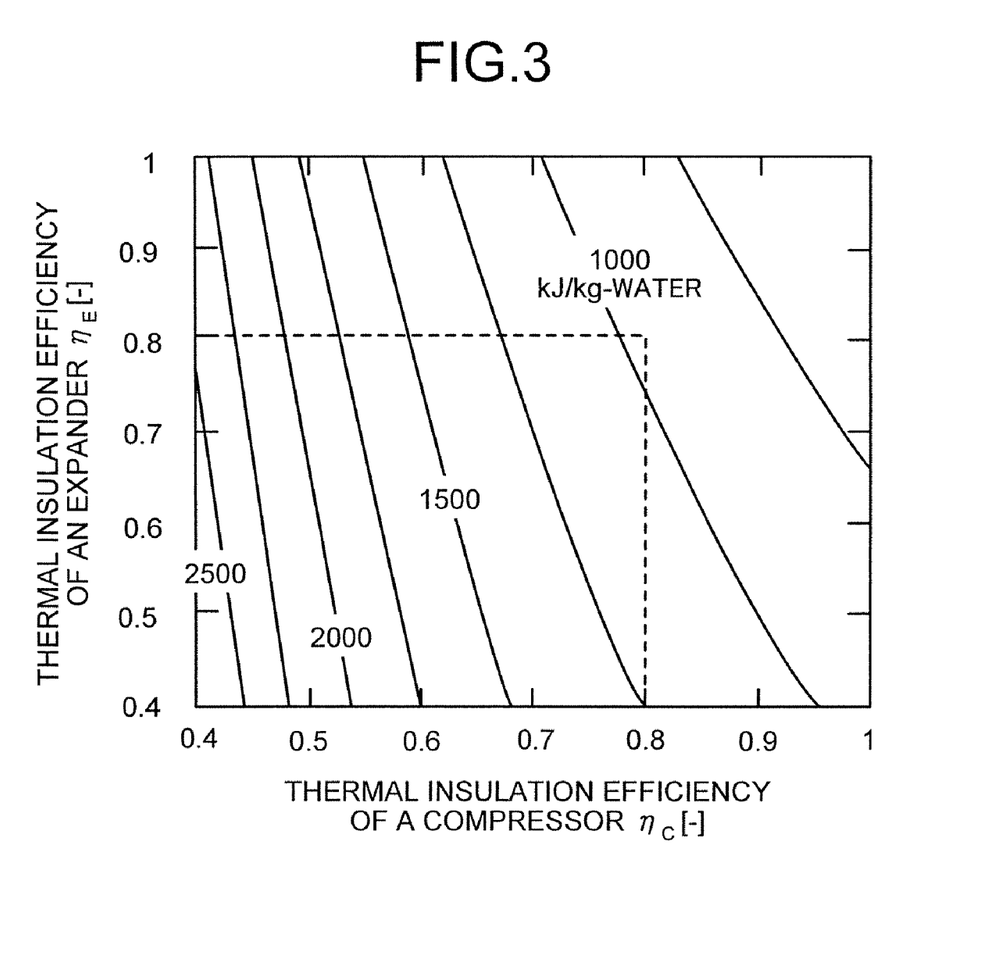
FIG. 3 is a graph showing power required for a second compressor for a thermal insulation efficiency of an expander and a thermal insulation efficiency of a compressor in the dehydration system of the present invention.

Here when it is supposed that dimethyl ether is approximated to an ideal gas and thermally insulated and compressed, the power required for the second compressor 1' is obtained for the thermal insulation efficiency in the expander 7 and the thermal insulation efficiency in the compressor 1 as shown in FIG. 3.

When both the thermal insulation efficiencies in the compressor 1 and the expander 7 are 0.8, the power required for the present system is 948 kJ/kg-water. This compression efficiency is the same as the compression efficiency in the compressor for collecting the latent heat of the water vapor used in the power estimation in the in-oil modification process (Judicial Foundation, The Institute of Applied Energy, New Energy Prospect, Modification technology for low-grade coal, 1977).

From this estimation result, it has been theoretically confirmed that the dehydration can be accomplished with less required energy in accordance with the dehydration system of the present invention.

EXAMPLES

The present invention will be described in more detail below based on Examples. The invention is not limited to the following Examples.

Example 1

Dehydration Test of Paper Diaper

Using 10 sheets of paper diapers (average dry weight: 0.455 g), 600 g (2 sheets), 500 g (4 sheets) or 250 g (4 sheets) of artificial urine composed of the following composition was impregnated per sheet, and this was made one batch. Seven batches were subjected to the test. A total amount of the artificial urine absorbed to 10 sheets of the paper diapers was all 4.2 kg per batch.

| [Composition of artificial urine: Contents in 1019.2 g (1 L)] | |
|---|---|
| Ion-exchange water | 984 g |
| Urea | 20.7 g |
| NaCl | 6.48 g |
| KCl | 0.64 g |
| $K_2SO_4$ | 3.21 g |
| $Na_3PO_4$ | 2.55 g |
| $NH_4Cl$ | 1.58 g |

The paper diapers in a water-containing state prepared as the above were dehydrated using liquefied dimethyl ether (DME) with purity of 99% or more by a test model of the dehydration system shown in FIG. 1.

That is, the paper diapers in the water-containing state were filled in a container corresponding to the dehydrator 3 in FIG. 1, and the weight including the container was measured as a total every batch to calculate the weight of the paper diapers per se. The liquefied DME was filled in a stainless container provided with a position between the condenser 2 and the dehydrator 3, and this was extruded by compressed nitrogen with 0.7 to 0.9 Mpa in the condenser 2 to distribute it in the dehydrator 3 (container). The liquefied DME was collected in an empty sealed container for pooling the liquefied DME, disposed between the dehydrator 3 and the cooler 4'.

The test model has a treating capacity to dehydrate 10 L of test samples as one batch treatment, and a time period required for the dehydration at that time may be set in the range of 80 minutes to 3 hours in terms of reliability. The compressor power was 2291 kJ/kg-contained water when an electricity generation efficiency was supposed 0.35.

The experiments were performed at room temperature, and for a distribution rate and a distribution time period (dehydration time period) of the liquefied DME, various combinations as shown in Table 1 were employed in respective batches. The experiment for one batch was repeated five times under the same condition, and the result was represented by their mean value.

After the completion of the dehydration, weights of the paper diapers before and after the dehydration, reduced weights after the dehydration (weight of reduced amount) and weights of wastewater were measured. The results are shown in Table 1

TABLE 1

| Dehydration experiment of paper diapers | | | | | |
|---|---|---|---|---|---|
| Distribution rate (L/time) | Dehydration time period | Weight of the paper diapers before dehydration (kg) | Weight of the paper diapers after dehydration (kg) | Weight of reduced amount (kg) | Weights of wastewater (kg) |
| 100 | 90 min. to 2 hrs. | 4.555 | 1.060 | 3.495 | 3.462 |
| 100 | 56 min. and 8 sec. | 4.642 | 0.733 | 3.908 | 3.992 |
| 200 | 28 min. and 4 sec. | 4.643 | 0.901 | 3.722 | 3.838 |
| 200 | 14 min. and 2 sec. | 4.647 | 2.172 | 2.475 | 2.537 |
| 400 | 13 min. and 20 sec. to 14 min. and 2 sec. | 4.658 | 2.131 | 2.527 | 2.584 |
| 100 | 56 min. and 8 sec. | 4.660 | 1.117 | 3.543 | 3.210 |
| 200 | 28 min. and 4 sec. | 4.670 | 0.763 | 3.908 | 4.240 |

As is evident from Table 1, it has been found in all batches that the weight of the paper diapers after the treatment was remarkably reduced compared to that before the treatment and that the majority of the absorbed artificial urine was discharged as shown by the wastewater (artificial urine) weight. The wastewater weight was often larger than the reduced weight, and this is speculated to be caused by DME included in the paper diapers after the treatment and the wastewater.

From these results, it has been confirmed that according to the present invention, the large amount of urine can be easily eliminated from the paper diapers containing the urine in a short time period under the condition close to the outdoor air temperature.

Example 2

Dehydration Test of Sanitary Products

Using 32 sanitary products (average dry weight: 36.7 g), 60 g of artificial blood composed of the following composition was impregnated per product, which were then subjected to the test. The total amount of the artificial blood absorbed in 32 sanitary products was 1.92 kg.

| [Composition of artificial blood: Contents in 1059.9 g (1 L)] | |
| --- | --- |
| Ion-exchange water | 852 g |
| Urea | 0.22 g |
| Glucose | 0.65 g |
| NaCl | 3.96 g |
| KCl | 0.18 g |
| Bovine hemoglobin | 163 g |
| Bovine albumin | 23.1 g |
| Bovine globulin | 16.8 g |

The dehydration was performed by the same way as in Example 1, except that the sanitary product was used in place of the paper diaper, the distribution rate was 100 L/hour and the dehydration time period was 2 hours. The test was repeated seven times under the same condition, and the result was represented by their mean value.

As a result, 1.71 kg of the artificial blood was eliminated from 32 sanitary products, indicating that the majority of an initially absorbed amount was dehydrated.

From these results, it has been confirmed that according to the present invention, the large amount of blood can be easily eliminated from the sanitary product containing the blood in the short time period.

Example 3

Dehydration Test of Wood Chips

The dehydration test was performed by the same way as in Example 1, except that 3.11 kg of wet wood chips was used, and the distribution rate was 100 L/hour and the dehydration time period was 3 hours. The test was repeated five times under the same condition, and consequently 1.99 kg as the average was discharged.

From these results, it has been confirmed that according to the present invention, the large amount of contained water can be easily eliminated from the water-containing (wet) wood chips in a short time period.

Example 4

Dehydration Test of Weeds

The dehydration test was performed by the same way as in Example 1, except that 2.94 kg of wet weeds was used, and the distribution rate was 100 L/hour and the dehydration time period was 80 to 90 minutes. The test was repeated three times under the same condition, and consequently the wastewater weight was 2.97 kg as the average. The wastewater weight larger than the initial weight of the weeds is speculated to be attributed to contained DME.

From these results, it has been confirmed that according to the present invention, the large amount of contained water can be easily eliminated from the water-containing (wet) weeds in the short time period.

Example 5

Dehydration Test of Leftover Meals

The dehydration test was performed by the same way as in Example 1, except that 6.28 kg of leftover meals (Japanese wheat noodles, rice cocked with wild vegetables) were used, and the distribution rate was 100 L/hour and the dehydration time period was 2 hours. Consequently the wastewater weight after the dehydration was 4.15 kg.

The dehydration test was also performed by the same way as in Example 1, except that 5.71 kg of leftover meals (food names: set meal with mixed flies, curry and rice) were used, and the distribution rate was 100 L/hour and the dehydration time period was 2 to 3 hours. The same test was repeated twice, and consequently 3.40 kg of contained water could be dehydrated.

From these results, it has been confirmed that according to the present invention, the large amount of contained water can be easily eliminated from the water-containing (wet) leftover meals in the short time period.

Example 6

Dehydration Test of Bouquet

The dehydration test was performed by the same way as in Example 1, except that 0.09 kg of a bouquet (10 kinds of cultivars were randomly selected) was used, the dehydration was first performed at a distribution rate of 100 L/hour for 15 minutes, and subsequently the bouquet was immersed for 3 hours by stopping the flow of dimethyl ether to retain dimethyl ether in a dehydration chamber. As a result, the weight after the dehydration was 0.02 kg, and 0.07 kg was reduced from the initial weight.

Meanwhile, the dehydration test was performed by the same way as in Example 1, except that 0.58 kg of a bouquet (10 kinds of cultivars were randomly selected) was used, and the distribution rate was 100 L/hour and the distribution time period was 3 hours. As a result, the weight after the dehydration was 0.13 kg, and 0.45 kg was reduced from the initial weight.

From these results, it has been confirmed that according to the present invention, the large amount of contained water can also be easily eliminated from the bouquet in the short time period.

As in the above, the dehydration method of the water-containing substance according to the present invention is applicable to various water-containing substances, and can simply eliminate the contained water from any water-containing substances with low power in the short time period. Therefore, the present invention reduces the weight by eliminating the contained water from the water-containing substance and makes the treatment and the reuse as the waste or the utilization as the biomass easy.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims along with their full scope of equivalents.

What is claimed is:

1. A method for dehydrating a water-containing substance, comprising
   (1) contacting by countercurrent flow a liquefied matter with the water-containing substance to dissolve water present in the water-containing substance into the liquefied matter and thereby obtaining a solution comprising water; and
   (2) vaporizing said liquefied matter out of said solution comprising water to separate the liquefied matter in the gas state from the water, wherein
   said water-containing substance is at least one member selected from the group consisting of a soiled paper diaper, a sanitary product, a weed, a bouquet, a jelly fish, wood, a leftover meal, raw garbage, sewage sludge and soil,
   at least 53% of water is separated from said water-containing substance,
   said liquefied matter comprises at least one compound that is in the gas phase at ambient temperature and atmospheric pressure, and
   a flow rate of said liquefied matter is at least 10 L/h.

2. The method according to claim 1, further comprising (3) collecting said gas, which has been vaporized and separated in said (2) and liquefying said gas to obtain a further liquefied matter, and
   recycling said further liquefied matter obtained from said (3) collecting into said (1) contacting.

3. The method according to claim 1, wherein said liquefied matter is a substance which is in a gas phase at 25° C. and at 1 atm.

4. The method according to claim 1, wherein said liquefied matter comprises at least one member selected from the group consisting of dimethyl ether, ethyl methyl ether, formaldehyde, ketene and acetaldehyde.

5. The method according to claim 1, wherein said contacting is carried out for at least 5 minutes.

6. The method according to claim 1, wherein an amount of the liquefied matter present in said contacting is at least a theoretical amount required for dissolving the water present in the water-containing substance into the liquefied matter.

7. The method according to claim 1, wherein said contacting and said vaporizing are performed at least once and at temperature ranging from −10 to 50° C.

8. The method according to claim 1, wherein said flow rate of said liquefied matter is at least 30 L/h.

9. The method according to claim 1, wherein said flow rate of said liquefied matter is from 50 to 300 L/h.

10. The method according to claim 1, which is carried out a temperature of from 0 to 40° C.

11. The method according to claim 1, wherein said liquefied matter is a substance which is in a gas phase at 0° C. and at 1 atm.

12. The method according to claim 1, wherein said contacting occurs for a period of at least 5 minutes.

13. The method according to claim 1, wherein said contacting occurs for a period of at least 8 minutes.

14. The method according to claim 1, wherein said contacting occurs for a period of from 10 minutes to 5 hours.

15. A method for dehydrating a water-containing substance, comprising
   (1) contacting by countercurrent flow a liquefied matter with the water-containing substance to dissolve water present in the water-containing substance into the liquefied matter and thereby obtaining a solution comprising water; and
   (2) vaporizing said liquefied matter out of said solution comprising water to separate the liquefied matter in the gas state from the water, wherein
   said liquefied matter comprises at least one compound that is in the gas phase at ambient temperature and atmospheric pressure, and
   a flow rate of said liquefied matter is at least 10 L/h, wherein a dehydrated soiled paper diaper, a dehydrated sanitary product, a dehydrated jelly fish, dehydrated wood, a dehydrated leftover meal, dehydrated raw garbage, dehydrated sewage sludge or dehydrated soil is obtained by said method.

16. A method for dehydrating a water-containing substance, comprising
   (1) contacting by countercurrent flow a liquefied matter with the water-containing substance to dissolve water present in the water-containing substance into the liquefied matter and thereby obtaining a solution comprising water; and
   (2) vaporizing said liquefied matter out of said solution comprising water to separate the liquefied matter in the gas state from the water, wherein
   said liquefied matter comprises at least one compound that is in the gas phase at ambient temperature and atmospheric pressure,
   a flow rate of said liquefied matter is at least 10 L/h,
   an amount of the liquefied matter present in said contacting is at least a theoretical amount required for dissolving the water present in the water-containing substance into the liquefied matter, and
   said theoretical amount is 14.9 grams when said liquefied matter is dimethyl ether.

* * * * *